United States Patent [19]

Jones et al.

[11] Patent Number: 4,947,933
[45] Date of Patent: Aug. 14, 1990

[54] TEMPERATURE ACTIVATED POLYMER FOR PROFILE CONTROL

[75] Inventors: Lloyd G. Jones; Winston R. Shu, both of Dallas, Tex.

[73] Assignee: Mobil Oil Corporation, New York, N.Y.

[21] Appl. No.: 292,845

[22] Filed: Jan. 3, 1989

[51] Int. Cl.⁵ .................... E21B 33/138; E21B 43/22; E21B 43/24

[52] U.S. Cl. ..................... 166/263; 166/272; 166/274; 166/288; 166/295; 166/300; 166/302; 166/303

[58] Field of Search ............... 166/270, 272, 273, 274, 166/288, 294, 295, 300, 302, 303, 57; 523/130

[56] References Cited

U.S. PATENT DOCUMENTS

| | | | |
|---|---|---|---|
| Re. 30,767 | 10/1981 | Felder et al. | 166/288 X |
| 3,155,160 | 11/1964 | Craig, Jr. et al. | |
| 3,259,186 | 7/1966 | Dietz . | |
| 3,490,533 | 1/1970 | McLaughlin | 166/270 |
| 3,669,188 | 6/1972 | Coles et al. | 166/288 X |
| 3,918,521 | 11/1975 | Snavely, Jr. et al. | 166/272 |
| 4,074,757 | 2/1978 | Felber et al. | 166/261 |
| 4,257,650 | 11/1981 | Allen | 166/245 |
| 4,440,228 | 4/1984 | Swanson | 166/274 |
| 4,461,351 | 7/1984 | Falk | 166/295 |
| 4,476,932 | 10/1984 | Emery | 166/302 X |
| 4,489,783 | 12/1984 | Shu | 166/272 |
| 4,537,254 | 8/1985 | Elson et al. | 166/303 X |
| 4,569,393 | 2/1986 | Bruning et al. | 166/272 X |
| 4,637,467 | 1/1987 | Shaw et al. | 166/295 |
| 4,665,986 | 5/1987 | Sandiford | 166/272 X |
| 4,705,113 | 11/1987 | Perkins | 166/302 |
| 4,799,548 | 1/1989 | Mumallah et al. | 166/303 X |
| 4,804,043 | 2/1989 | Shu et al. | 166/303 X |
| 4,811,787 | 3/1989 | Navratil et al. | 166/273 |

Primary Examiner—George A. Suchfield
Attorney, Agent, or Firm—Alexander J. McKillop; Charles J. Speciale; Charles A. Malone

[57] ABSTRACT

A process for minimizing well recompletions in a hydrocarbonaceous fluid containing formation having an upper productive interval temperature in excess of 300° F. In this process, a temperature activated gellable composition is injected into a producer well in the productive interval after cooling said well to a temperature of about 300° F. to about 450° F. Once in the productive interval, the formation heats the gellable composition to a temperature sufficient to cause the composition to form a solid gel thus closing pores in the upper productive interval. Thereafter, ungelled composition is either diluted or removed from cooler areas of the formation so as to prevent forming a solid gel therein. Afterwards, a steam-flooding or a steam stimulation oil recovery operation is conducted to remove hydrocarbonaceous fluids from a lower productive interval without recompleting said lower interval. The gellable composition utilized comprises polyvinyl alcohol or polyacrylamide cross-linked with a phenolic compound and an aldehyde producing compound sufficient to form a phenolic resin in situ and later a rigid gel.

24 Claims, 3 Drawing Sheets

TEMPERATURE ACTIVATED POLYMER FOR PROFILE CONTROL

RELATED APPLICATIONS

This application is related to copending Ser. No. 068,290 filed July 1, 1987. It is also related to Ser. No. 292,795 which was filed on Jan. 3, 1989. Additionally, it is related to Ser. No. 292,799 which was filed on Jan. 3, 1989.

FIELD OF THE INVENTION

This invention relates to the use of temperature activated gels than can be used for profile control so that increased amounts of hydrocarbonaceous fluids can be obtained from a lesser permeability zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementry recovery techniques are employed. These techniques include waterflooding, miscible flooding, thermal recovery, and steam stimulation.

One of the problems encountered in producing wells in heavy oil reservoirs, with or without steam stimulation, is that early in the production phase, it is desirable, and often necessary, to complete and produce the well from near the top of the producing interval. This is desirable or necessary because the steam rises to the top of the producing zone due to gravity override, providing stimulation for oil production. If the well is not completed at the top, it may not respond soon enough to provide an economically feasible operation. Later on, as some of the oil is produced, the steam will simply breakthrough into the wellbore, moving only a minimal amount of oil with it, and making the overall recovery process very inefficient. It then becomes necessary to recomplete the well one or more times lower in the producing section. Recompletion is an expensive operation, and the economics of steam aided production is adversely affected by the need for recompletions. For this reason, methods have been disclosed for selectively plugging high permeability streaks and channels in reservoirs.

U.S. Pat. No. 4,074,757 to Felber et al. discloses a method for the selective plugging of undesirable high permeability streaks and channels in oil bearing reservoirs during temperature (250° F. or higher) injection recovery processes such as steam flooding, underground combustion flooding or a naturally occurring high temperature reservoir, or the like. Improved sweep efficiency is obtained by injecting a gel-forming solution consisting essentially of sodium or ammonium lignosulfonate and water or brine in the absence of other gelation promoters and then allowing the high temperatures of the underground formation to promote gelation. To ensure that the injected gel-forming solution is confined largely to the high permeability zone of the formation, it is necessary to isolate the offending, high-permeability zone by one or more packers or plug back procedures. However, this method does not ensure that there is no tendency for the gel-forming solution to flow into the low permeability zones of the formation.

Other U.S. patents teaching the use of polymers that are injected as monomer solutions and polymerize in-situ to effect plugging of highly permeable zones include U.S. Pat. No. 4,637,467 to Shaw et al. and U.S. Pat. No. 4,461,351 to Falk. These processes are not selective because the monomers before they polymerize can penetrate into high as well as the low permeability zones of the formation and packers are required to inject the monomer into selected portions of the formation.

Therefore, what is needed is a method of forming a solid gel in areas of a formation which have been heated to a temperature above 300° F. so as to minimize well recompletions.

SUMMARY OF THE INVENTION

This invention is directed to a method for minimizing well recompletions in a hydrocarbonaceous fluid containing formation having an upper productive interval temperature in excess of about 300° F. A producing well in said productive interval is heated to temperatures in excess of 300° F. when thermal oil recovery operations are conducted in the formation. This is particularly true when a steam flooding enhanced oil recovery operation is utilized. In producer wells having temperatures in excess of 500° F., the temperature in the producing well is cooled to between 350° F. and 450° F. Thereafter, a temperature activated gellable composition is injected into the production well where it enters the upper productive or stimulated interval of the porous media. Upon reaching a temperature of about 350° F. to about 450° F. in the upper productive interval, the gellable composition forms a rigid gel. The gellable composition contains a water dispersible polymer, an aldehyde containing compound which decomposes to yield formaldehyde, and a phenolic compound. Upon reacting the activating temperature the cyclic dimer decomposes to yield an aldehyde which in turn reacts with the phenolic compound to form phenolic resin, the gelant, in situ. Thereafter, the phenolic resin gels the polymer thereby forming a rigid gel.

This rigid gel reduces the transmissibility of hydrocarbonaceous fluids through the productive interval and contiguous zones substantially near the top of the formation which have been heated by said recovery process. In addition to reducing the transmissibility of fluids through the heated zones, the rigid gel causes steam from a subsequent steam flooding or steam stimulation operation to be diverted to a deeper level in the producing interval, thereby producing additional hydrocarbonaceous fluids to the surface.

Gellable aqueous compositions which can form a solid gel upon reaching a temperature above 300° F. are comprised of selected water dispersing polymers, phenolic compounds, and aldehyde producing compounds. Polymers which are utilized herein are selected from a member of the group consisting of polyvinyl alcohol, polyvinyl alcohol copolymers, polyacrylamide, polyvinyl amine, sulfonated polyvinlyl alcohol, and poly(acrylamide-co-acrylamide-2-methylpropane sulfonate). Phenolic compounds which can be used include phenol, catechol, resorcinol, phloroglucinol, 4,4'-diphenol, 1,3-dihydroxynaphthalene, and related similar compounds. Aldehyde producing compounds which can be utilized herein upon reaching a temperature above about 300° F. include trioxane, paraformaldehyde, and tetraoxane.

It is therefore an object of this invention to provide for a temperature activated gellable composition which can be delivered into a heated upper productive zone having a temperature sufficient to activate said composition and selectively form a solid gel therein.

It is another object of this invention to provide for a temperature activated gellable composition which can be delivered into a formation's steam override zone having a temperature above about 300° F. and thereafter form a solid gel therein.

It is yet another object of this invention to provide for a composition which avoids forming a solid gel in a cooler zone of lesser permeability or an unheated zone of a formation.

It is another further object of this invention to provide for a composition that will minimize gel damage to a cooler zone of lower permeability while closing pores in a higher permeability zone having a temperature above about 300° F.

It is still another object of this invention to inject a heat activated gellable composition into a producer well and cause a solid gel to form in the heated productive interval so as to divert sweep fluids into a lower productive area of the formation.

It is a still yet further object of this invention to provide for a composition which will increase the effeciency of a drive fluid through a formation thereby increasing the yield of hydrocarbonaceous fluids therefrom.

DESCRIPTION OF THE PREFERRED EMBODIMENTS

Figure 1:
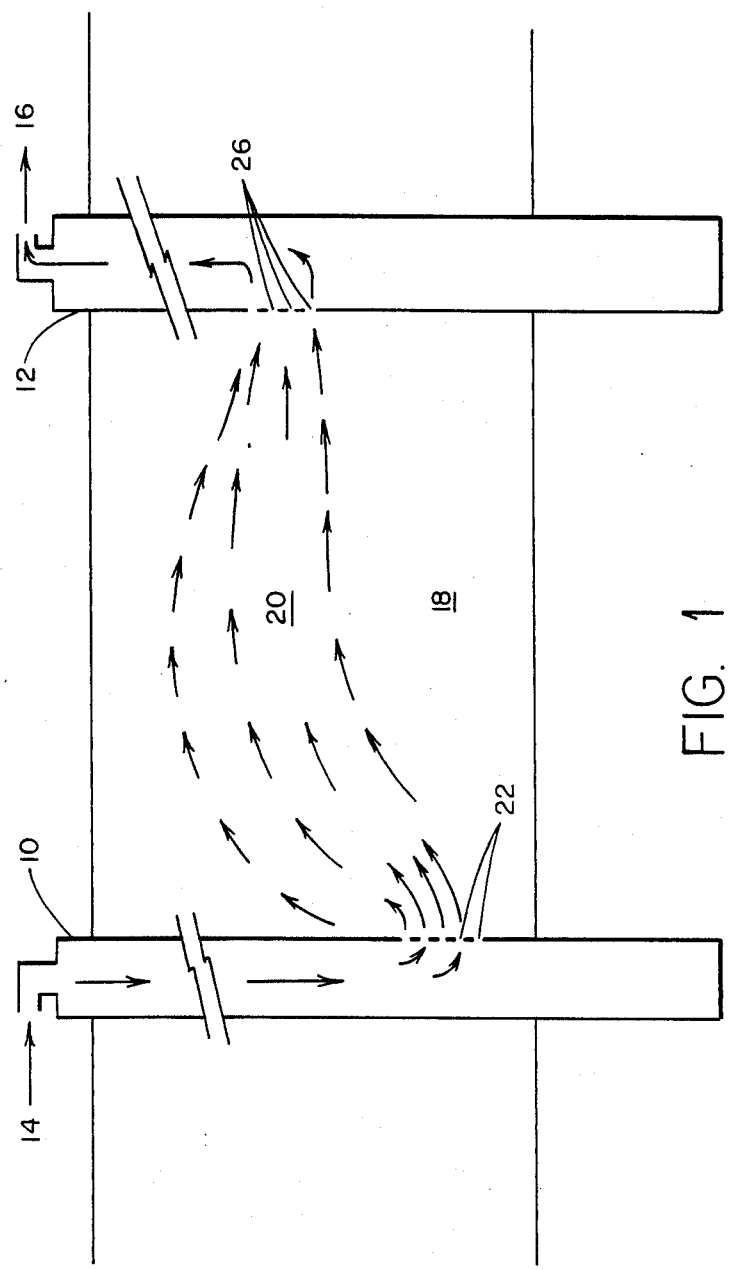
FIG. 1 is a diagrammatic plan view of a formation wherein steam has passed through a high permeability zone or area into production well.
Figure 2:
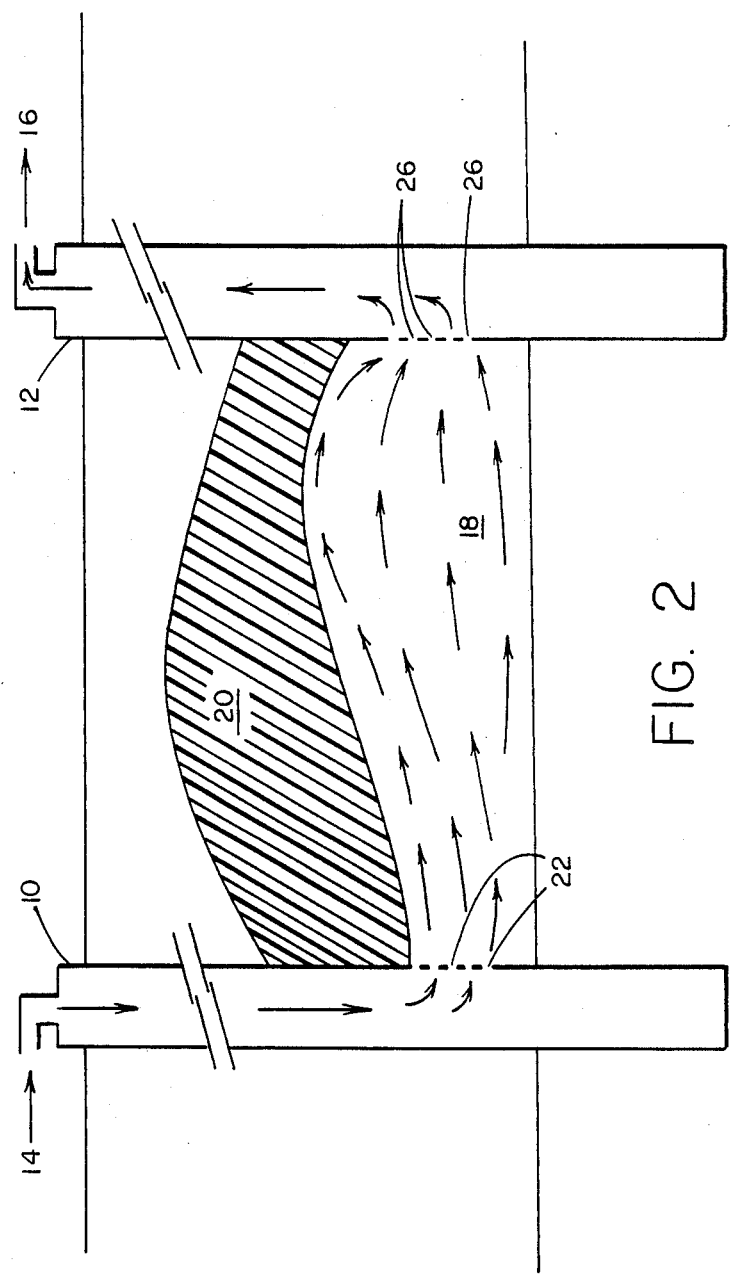
FIG. 2 is a diagrammatic plan view where the high permeability zone has been closed with a heat reactive gel while steam is passing through a low permeability zone or area.
Figure 3:
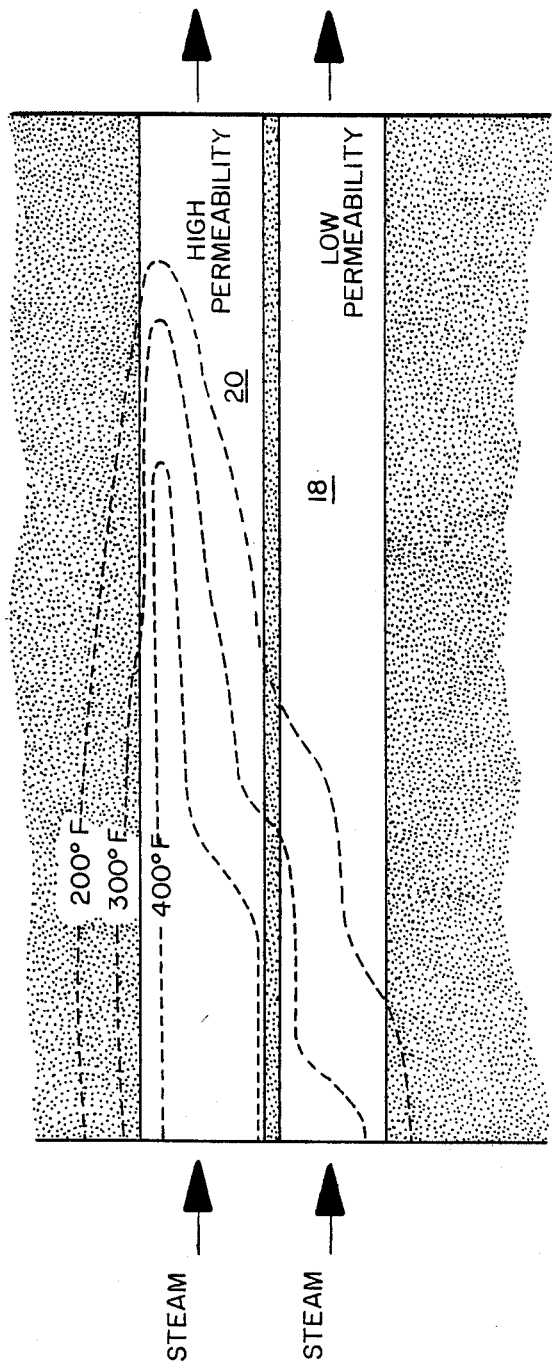
FIG. 3 is a schematic representation which illustrates temperature distribution into high and low permeability zones of a formation during steam flooding or steam stimulation.

During the recovery of hydrocarbonaceous fluids from a formation wherein a steam flooding process is utilized, as is shown in FIG. 1, steam enters conduit 14 of injection well 10. Afterwards, steam exits injection well 10 via perforations 22 and enters permeability zone 20. Steam and hydrocarbons obtained from high permeability zone 20 exit through production well 12 via perforations 26. Thereafter, steam and hydrocarbonaceous fluids exit production well 12 via conduit 16. During this steam flooding process, the formation is heated up by the steam. While being heated, a temperature contour is developed in either a steam flooded or a steam stimulated formation. Thus, the "thief" zones and zones swept by override steam have the highest temperatures in the formation while the underswept parts in the formation have the lowest. This concept is illustrated in FIG. 3. The concept illustrated in FIG. 3 is equally applicable to a thermal technique where steam is utilized with a single well. This technique is known as the "huff and puff" method. This method is described in U.S. Pat. No. 3,259,186 which is hereby incorporated by reference herein. In this method, steam is injected via a well in quantities sufficient to heat the subterranean hydrocarbon-bearing formation in the vicinity of the well. The well is then shut-in for a soaking period, after which it is placed on production. After projection has declined, the "huff and puff" method may again be employed on the same well to again stimulate production.

The application of single well schemes employing steam injection and as applied to heavy oils or bitumen is described in U.S. Pat. No. 2,881,838, which utilizes gravity drainage. This patent is incorporated by reference herein. An improvement of this method is described in a later patent, U.S. Pat. No. 3,155,160, in which steam is injected and appropriately timed while pressuring and depressuring steps are employed. Where applicable to a field pattern, the "huff and puff" technique may be phased so that numerous wells are on an injection cycle while others are on a production cycle; the cycles may then be reversed. This patent is hereby incorporated by reference herein.

U.S. Pat. No. 4,257,560, describes a method for recovering high viscosity oils from subsurface formations using steam and an inert gas to pressurize and heat the formation and the oil which it contains. The steam and the inert has may be injected either simultaneously or sequentially, e.g. steam injection, followed by a soak period, followed by injection of inert gas. Inert gases referred to include helium, methane, carbon dioxide, flue gas, stack gas and other gases which are noncondensable in character and which do not interact either with the formation matrix or the oil or other earth materials contained in the matrix. This patent is hereby incorporated by reference herein.

When it becomes uneconomical to continue injecting steam to recover hydrocarbonaceous fluids via a "huff and puff" method or from a heated high permeability zone where steam flooding is employed as shown in FIG. 1, steam injection into injection well 10 is ceased. Eventually, steam and hydrocarbonaceous fluids cease to flow into producer well 12. Producer well 12 is heated to a temperature often in excess of 300° F. In order to obtain hydrocarbonaceous fluids from overridden zone 18, steam override into the heated upper level 20 of the formation has to be stopped. Although the lower level of well 12 contains perforations 26, communication has not been established between the infector well 10 and perforations 26, of the producer well 12 because of steam override into heated higher productive level 20 and perforations 25. Communication therefore has to be established between injector well 10 and the producer well 12 at the lower productive level 18, perforations 26.

To accomplish this, in one embodiment of this invention, a temperature activated gellable composition is directed down producer well 12. Prior to directing said composition into producer well 12, the temperature within the well is determined. The temperature can be measured by a downhole or surface device as is known by those skilled in the art. If the well temperature is hot enough to activate the gellable composition so as to cause a solid or rigid gel to form in the well, the well is cooled. Several methods can be sued to cool the well. In one embodiment, a cooling fluid preferably water, can be injected as a spacer prior to injecting the gellable composition into well 12 and the formation. Injection of the cooling fluid is continued until producer well 12 has been cooled to a temperature of about 300° F. to about 450° F.

In another embodiment, the cooling fluid can be circulated into producer well 12 through a concentric string consisting of an inner and an outer tubing. The cooling fluid flows down the inner tubing and out of the concentric string by the outer tubing. During the circulation of the cooling fluid into and out of the powder well 12, the concentric string remains in contact with producer well 12 so as to cool it to a temperature of about 300° F. to about 450° F. Cooling producer well 12 in this manner allows for more precise control of the cooling process. Upon obtaining a desired temperature sufficient to prevent premature gellation of the gellable composition, circulation of cooling fluid into producer well 12 is stopped.

After circulation of cooling fluid into the concentric string is stopped, the temperature activated gellable composition is injected down producer well 12 via the concentric string. To accomplish this a surface return valve on the concentric string is closed thereby stopping the circulation of fluid from the concentric string. The activated gellable composition is displaced into higher productive interval 20 by continued injection or pumping into the concentric string. Displacement of the temperature activated gellable composition can be aided by placing a trailing fluid e.g. water into producer well 12 through a pressure actuated valve or rupture disk.

Alternatively, to prevent the temperature activated gellable composition from polymerizing in producer well 12, an injection string e.g. a coiled tubing can be used to inject the gellable composition into lower cooled productive interval 18. To keep the gellable composition in a cooled condition, the injection string can be insulated. Additionally, the gellable composition can be kept cool by using an injection string in combination with the concentric string. In this manner, production well 12 can be cooled while simultaneously injecting the gellable composition into lower productive interval 18 with the injection string.

Once the injected gellablecomposition circulates up producer well 12 to heated upper producing interval 20, it forms a rigin solid gel in producing interval 20 upon reaching a temperature of from about 300° to about 450° F. Since the lower productive interval 18 is less than about 300° F., the gellable composition remains ungelled in that interval. Ungelled material can be removed from lower productive interval 18 by pumping it out or injecting water to circulate it out.

When an enhanced oil recovery method is subsequently commenced in injection well 10 communication is established with producer well 12 via lower productive level 18 through perforations 26. Utilization of this method increases sweep efficiency in the formation while enhancing the recovery of additional hydrocarbonaceous fluids. The entire process can be repeated until the desired steam or water to oil ratio has been obtained. In many instances it will not be necessary to recomplete the lower productive interval with additional perforations. Of course, should it become necessary additional perforations can be directed through producer well 12 and into lower productive interval 18.

Aqueous gellable heat activated compositions which can be utilized herein are comprised of a polymer, a phenolic compound, and an aldehyde. Polymers utilized herein are water dispersible polymers. The term "polymer" is employed generically to include both homopolymers and copolymers. The term "water-dispersible polymers" is used generically to include those polymers which are truly water-soluble and those polymers which are dispersible in water or in other aqueous medium to form stable colloidal suspensions which can be gelled. Also, the term "aqueous dispersion" is utilized generically to include both true solutions and stable colloidal suspensions of components of the composition of this invention which can be gelled as will be described herein. Water-dispersible polymers which are used herein are selected from a member of the group consisting of polyvinyl alcohol, polyacrylamide, sulfonated polyvinyl alcohol, and poly(acrylamide-co-acrylamido-2-methylpropane sulfonate). Polyvinyl alcohol (PVA) at various degrees of hydrolysis are useful. Other polymers containing OH, $NH_2$, $CONH_2$, and SH functional groups are also useful. Polyvinyl amine, and copolymers containing the previously mentioned functional groups are useful. Any of these water-dispersible polymers are placed into an aqueous mixture in amount of from about 0.5 to about 5.0 wt. %. The aqueous medium can comprise fresh water, brackish water, or sea water, and mixtures thereof. Polyacrylamide and poly(2-acrylamido-2-methylpropane sulfonate) are discussed in U.S. Pat. No. 4,440,228 which issued on Apr. 3, 1984 to Swanson. This patent is hereby incorporated herein in its entirety.

After placing the selected water-dispersible polymer into the aqueous medium, a phenolic compound is added to the mixture. Phenolic compounds which can be used herein include phenol, naphthol, catechol, resorcinol, phlorohlucinol, 4,4'-diphenol, 1,3-dihydroxynaphthalene, and related similar compounds. The amount of phenolic compound utilized should be in excess of 0.5 wt. % or higher. The amount of phenolic compound used herein should be sufficient to impart the desired gellation effect within the desired time period.

Once the phenolic compound has been added, a water-dispersible aldehyde is mixed into the aqueous mixture. Under proper conditions of use, both aliphatic and aromatic monoaldehydes, and dialdehydes, can be used. The aliphatic monoaldehydes containing from 1 to about 10 carbon atoms per molecule are presently preferred. Representative examples of such aldehydes include formaldehyde, trioxane, tetraoxane, polyoxymethylene, and other polymeric aldehydes. Representative examples of dialdehydes include glyoxal, glutraldehyde, terephthaldehyde, and mixtures thereof. The term "water-dispersible" is employed generically to include both those aldehydes which are truly water-soluble and those aldehydes of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be small but in an amount sufficient to cause gellation of an aqueous dispersion of a polymer, the aldehyde, and the phenolic compound. As a general guide, the amount of aldehyde used in preparing the gel compositions herein will be in the range of from about 0.05 to about 5, preferably 1.0 to about 3.0 wt. % based on the total weight of the composition.

A preferred temperature activated gellable mixture comprises polyvinyl alcohol, phenol, and trioxane. The effect of temperature on said mixture is shown in Table 1. When exposed to a formation having a temperature of about 300° to about 350° or higher, a firm gel will form in about 1 day to about 15 days when 0.05 to about 0.5 wt. % of sodium hydroxide is utilized as is shown in Table 2. Polyvinyl alcohol is used in amounts of about 0.5 to about 5.0 wt. %. Phenol is used in about 0.5 to about 5.0 wt. % or higher. The phenol to trioxane ratio is about 1:5 to 0.5, preferably about 0.75. The polyvinyl alcohol/phenol weight ratio is from about 0.2 to about 2. Of course, a lower ratio is used when other higher molecular weight polymers are utilized. Polymer concentration is directly proportional to the gel strength. A rigid gel is formed which is proportional to the total materials content.

TABLE 1

Temperature Sensitivity of PVA/Phenol/Trioxane * Gelation

| Temp, °F. | 200 | 300 | 350 | 400 | 450 |
|---|---|---|---|---|---|
| Gel Time, days | no gel | no gel | 1 | 1 | 1 |

*2.5% PVA, 4% phenol, 3% trioxane

TABLE 2

Effect of NaOH Concentration on Gel * Time

| NaOH, % | 300° F. | 350° F. | 400° F. | 450° F. |
|---|---|---|---|---|
| 0.05 | No gel | 15 days | 8-9 days | 4 days |
| 0.1 | " | 15 days | 5-7 " | 2 " |
| 0.2 | " | 12 days | 2 " | 1 day |
| 0.3 | " | 9 days | 1 day | 1 " |
| 0.5 | " | 6 days | 1 " | 1 " |

*2.5% PVA, 4% phenol, 3% trioxane

Prior to injecting the aqueous temperature activated gellable mixture, the formation is heated as mentioned above during a steam flooding or steam stimulation enhanced oil recovery process. A formation temperature of about 350° F. is preferred. The method of this invention can also be used when the area in or substantially near either the injection well or the production well has been heated to the desired temperature. This method is particularly beneficial when it is desired to close the heated area around a production well which has suffered a premature steam breakthrough. In this situation, steam injection is ceased and the temperature activated gellable mixture is injected into the production well for a time sufficient to enter the areas which comprise the premature breakthrough zone. Afterwards the gellable mixture in that zone is allowed to form a solid gel. Once the solid gel is formed, an enhanced oil recovery method in which a drive fluid is utilized can be injected either through the injection well or the production well to recover hydrocarbonaceous fluids from a less permeable zone of the formation.

As demonstrated, the novelty of this invention is that the cross-linking reaction is activated at elevated temperatures greater than about 350° F. The cross-linking reaction is not activated at temperatures under 350° F. At high temperatures, trioxane, a cyclic dimer of formaldehyde decomposes to yield formaldehyde which in turn reacts with phenol to form phenolic resin, the gelant, in situ. Phenolic resin then gels the polymer.

Where it is desired to obtain increased sweep efficiency, gels of this invention can be used to plug a previously swept portion of a formation which has been heated to a temperature in excess of 300° F. Said gels can be directed to areas of increased porosity. Once a solid gel has formed, hydrocarbonaceous fluids can be removed from an area of lesser permeability by utilization in any of the below methods.

Additionally, the embodiments described above can be used where the producer well in-casing gravel packed for sand control.

Steamflood processes which can be utilized after closing productive interval 20 with the gels described herein are detailed in U.S. Pat. Nos. 4,489,783 and 3,918,521 issued to Shu and Snavely, respectively.

These patents are hereby incorporated by reference herein.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method to minimize well recompletions in a perforated production well in a reservoir or formation containing a heavy oil comprising:
   (a) injecting via said well into an upper producing interval in said formation a temperature activated gellable composition where said interval has obtained a temperature in excess of 300° F. which is sufficient to activate said composition which comprises a polymer, a phenolic compound, and an aldehyde producing compound that decomposes to yield formaldehyde thereby forming a phenolic resin in situ which aldehyde producing compound is a member selected from the group consisting of trioxane, tetraoxane, polyoxymethylene, other similar aldehyde producing compounds, and mixtures thereof; and
   (b) allowing said composition to remain in the productive interval for a time sufficient for components of the gellable composition to activate and form a rigid gel as a result of the polymer cross-linking with said phenolic resin which gel closes pores in the upper producing level.

2. The method as recited in claim 1 where a spacer volume of cold water is pumped into the formation after step (b) which keeps any ungelled composition from forming a solid gel.

3. The method as recited in claim 1 where a steam flooding or a steam stimulation enhanced oil recovery process is commenced after step (c).

4. The method as recited in claim 1 where the gellable composition comprises water, polyvinyl alcohol, phenol, and trioxane which forms a solid gel at a temperature of about 350° F. or greater.

5. The method as recited in claim 1 where the gellable composition comprises water, polyvinyl alcohol, phenol, and trioxane where the polyvinyl alcohol to phenol ratio is about 0.2:2.0, the phenol to trioxane ratio is about 1.5:0.5, and a gel forms in from about 1 to about 15 days with the addition of about 0.25 to about 0.5 wt. % of sodium hydroxide.

6. The method as recited in claim 1 where said gellable mixture comprises a polymer such as polyacrylamide, sulfonated polyvinyl alcohol, poly(acrylamide-co-acrylamido-2-methylpropane sulfonate) cross-linked with a phenolic resin formed in situ.

7. The method as recited in claim 1 where water less than about 300° F. is directed into the formation so as to remove any ungelled composition therefrom prior to commencement of a thermal oil recovery operation.

8. A method for minimizing well recompletions in a hydrocarbonaceous fluid containing formation having an upper productive interval temperature in excess of 300° F. comprising:
   (a) injecting a temperature activated gellable composition via a production well into the productive interval of the formation which composition contains a water dispersible polymer, a phenolic compound, and a compound which produces an aldehyde in situ sufficient to form a phenolic resin thereby gelling said composition at a temperature between about 300° F. to about 450° F. thereby forming a solid gel sufficient to close pores in said productive interval which aldehyde producing compound is a member selected from the group consisting of trioxane, tetraoxane, polyoxymethylene, other similar aldehyde producing compounds, and mixtures thereof; and (b) allowing said composition to remain in said productive interval at a temperature in excess of 300° F. for a time sufficient to form a solid gel, thereby closing pores in said upper productive interval;

(c) allowing said composition to remain in said productive interval at a temperature in excess of 300° F. for a time sufficient to form a solid gel, thereby closing pores in said upper productive interval; and (d) commencing an enhanced oil recovery operation and producing dydrocarbonaceous fluids from a lower productive level in the formation without reperforating said lower level.

9. The method as recited in claim 8 where a steam flooding or a steam stimulation enhanced oil recovery process is commenced after step (d).

10. The method as recited in claim 8 where a spacer volume of cold water is pumped into the formation after step (d) which keeps any ungelled composition from forming a solid gel.

11. The method as recited in claim 8 where the gellable composition comprises water, polyvinyl alcohol, phenol, and trioxane which forms a solid gel at a temperature of about 350° F. or greater.

12. The method as recited in claim 8 where the gellable composition comprises water, polyvinyl alcohol, phenol, and trioxane where the polyvinyl alcohol to phenol ratio is about 0.2:2.0, the phenol to trioxane ratio is about 1.5:0.5, and a gel forms in from about 1 to about 15 days with the addition of about 0.25 to about 0.5 wt. % of sodium hydroxide.

13. The method as recited in claim 8 where said gellable mixture comprises a polymer such as polyacrylamide, sulfonated polyvinyl alcohol, poly(acrylamide-co-acrylamido-2-methylpropane sulfonate) cross-linked with a phenolic resin formed in situ.

14. The method as recited in claim 8 where the cooling spacer fluid comprises water that is injected into the producer well by a removable concentric well string having an inner and an outer tubing until the temperature in the well has been cooled to a temperature sufficient to allow the gellable composition to enter the producing interval prior to forming a solid gel.

15. The method as recited in claim 8 where in step (a) an injection string located below the heated productive interval is used to inject the gellable composition into a lower productive interval where it circulates to the upper productive interval.

16. The method as recited in claim 8 where a concentric injection string is used to cool the producer well while simultaneously injecting the gellable composition into the upper productive interval.

17. The method as recited in claim 8 where said polymer is contained in the mixture in from about 0.5 to about 5.0 wt. %.

18. The method as recited in claim 8 where said aldehyde producing compound is contained in said gellable mixture in about 0.05 to about 5.0 wt. %.

19. The method as recited in claim 8 where the phenolic compound is contained in said gellable mixture in about 0.005 to about 2 wt. % and is a member selected from the group consisting of phenol, naphthol, catechol, resorcinol, phloroglucinol, pyrogallol, 4,4'-diphenol, and 1,3-dihydroxynaphthalene.

20. A method for minimizing well recompletions in a hydrocarbonaceous fluid containing formation having an upper productive interval temperature in excess of 300° F. comprising:

(a) directing a cooling spacer fluid into a producer well in said upper productive interval until said well is cooled to a temperature of about 300° F. to about 450° F;

(b) injecting a temperature activated gellable composition into the productive interval of the formation via the production well which composition comprises water, polyvinyl alcohol, phenol and trioxane in an amount sufficient to form a phenolic resin in situ and cross-link with said alcohol at a temperature greater than about 300° F.;

(c) allowing said mixture to remain in the formation for a time sufficient to form a solid gel in said upper productive interval which has a temperature greater than about 300° F.;

(d) injecting cold water into the formation in an amount sufficient to prevent any ungelled mixture from forming a solid gel; and (e) injecting thereafter steam via an infection well into the formation which enters a lower productive interval of the formation where the temperature was not previously heated above about 300° F. and removing hydrocarbonaceous fluids therefrom.

21. The method as recited in claim 20 where a cooling spacer fluid comprises water that is injected into the productive interval by a removable concentric well string having an inner and an outer tubing until the producing wellbore temperature has been cooled to a temperature sufficient to allow the gellable composition to enter the producing interval prior to forming a solid gel.

22. The method as recited in claim 20 where an injection string located below the heated productive interval is used to inject the gellable composition into the heated formation.

23. The method as recited in claim 20 where a concentric injection string is used to cool the producer well while simultaneously injecting the gellable composition into a lower productive interval where it circulates to the upper productive interval.

24. The method as recited in claim 20 where the polyvinyl alcohol to phenol ratio is about 0.2:2.0, the phenol to trioxane ratio is about 1.5:0.5, and a gel forms in from about 1 to about 15 days with the addition of about 0.25 to about 0.5 wt. % of sodium hydroxide.

* * * * *